United States Patent

Kim et al.

[11] Patent Number: 6,097,861
[45] Date of Patent: Aug. 1, 2000

[54] MULTI-WAVELENGTH CHANNEL TRANSMISSION FILTER

[75] Inventors: Kyong Hon Kim; Hak Kyu Lee; Joon Tae Ahn; El Hang Lee, all of Daejon-Shi, Rep. of Korea

[73] Assignee: Electronics and Telecommunications Research Institute, Daejon-Shi, Rep. of Korea

[21] Appl. No.: 09/112,373

[22] Filed: Jul. 9, 1998

[30] Foreign Application Priority Data

Sep. 8, 1997 [KR] Rep. of Korea ............ 97-46101

[51] Int. Cl.[7] ................................... G02B 6/26
[52] U.S. Cl. .................. 385/27; 385/37; 385/31; 385/24; 385/46
[58] Field of Search .................. 385/27, 37, 31, 385/24, 16, 11, 12, 46

[56] References Cited

U.S. PATENT DOCUMENTS 5,408,319  4/1995  Halbout et al. .................. 356/352
5,682,446  10/1997  Pan et al. .......................... 385/11
5,689,593  11/1997  Pan et al. .......................... 385/11

OTHER PUBLICATIONS

S.V. Chernikov et al., "All–Fiber Dispersive Transmission Filters based on Fiber Grating Reflectors", Optics Letters, vol. 20, No. 14, Jul. 15, 1995, pp. 1586–1588.

*Primary Examiner*—Phan T. H. Palmer
*Attorney, Agent, or Firm*—Jacobson, Price, Holman & Stern, PLLC

[57] ABSTRACT

An improved multi-wavelength channel transmission filter, by which it is possible to selectively and simultaneously separate multiple wavelength channel signals without any optical time delays among, different wavelength channels, includes one optical circulator with four terminal ports, one polarization beam splitter (PBS), one half-wave plate, and a number of Bragg, gratings formed in an optical waveguide for reflection of multi-wavelength channels by combining the wavelength characteristic of each Bragg grating which is determined in accordance with the grating structure.

7 Claims, 6 Drawing Sheets

MULTI-WAVELENGTH CHANNEL TRANSMISSION FILTER

BACKGROUND OF THE INVENTION

1. Field of the Invention

The present invention relates to a multi-wavelength channel transmission filter, and particularly, to an improved multi-wavelength channel transmission filter which is capable of stabilizing and standardizing wavelengths (or frequencies) of multi-wavelength (or multi-frequency) channels simultaneously for a wavelength (or a frequency) division multiplexed high capacity optical communication system, and separating multiple wavelength channel signals, and is well adaptable to various application and practical uses.

2. Description of the Conventional Art

In the conventional wavelength (or frequency) division multiplexed large capacity optical communication systems, it is necessary to stabilize and standardize the wavelengths (or the frequencies) of multiple wavelength (or frequency) channels, and it is important to secure a device capable of separating multiple wavelength channel signals.

In addition, in the high density wavelength-division-multiplexed optical communication systems, a WDM channel scheme with unequal channel spacings is necessary to minimize the degradation or interference between channels due to optical nonlinear effects. (IEEE Photonics Technology Letters, Vol. 6, pp. 754–756, 1994)

In this optical communication system with multiple wavelength channels of unequal channel spacings, a method of using a number of the conventional single wavelength optical filters may be used. However, this method is not effective for a system composition because the optical wavelength filters are bulky, and may not be possibly used as a simultaneously transmitting multi-wavelength filer of low optical power loss.

Various types of optical filters have been studied. Among the optical filters, there are optical filters based on a bulky optics pigtailed with optical fibers and on optical fiber Bragg grating filters. The optical fiber Bragg grating filter is fabricated by exposing a ultraviolet (UV) ray laser beam to a UV sensitive optical fiber, and acts as a single wavelength reflection filter.

Among them there are a few type of optical filters capable of simultaneously separating and transmitting multiple wavelength (or frequency) channels. One of them is interferometer type optical filters which are formed as arrayed waveguide gratings arranged on a silicon wafer. Another type is an optical filter formed with a bulky grating optics and many optical fibers (or optical waveguides). In the latter type of filter, the reflected (or transmitted) beams from a reflection (or transmission) type bulk grating optics are launched into many optical fibers (or optical waveguides), each of which takes out a single wavelength channel. In addition, this type of grating is very difficult to fabricate since the position of the optical fiber or the optical waveguide, in which each wavelength channel diffracted by the diffraction grating is selected, is critical to accurate wavelength selections and sensitive to environment. This filter has a function of separating individual wavelength channel signal from the input multiple wavelength (or frequency) channel signals into each optical fiber or optical waveguide, but does not have a function of simultaneously separating a selectable choice of the multiple wavelength channels into one optical fiber or waveguide.

Technology for the interferometer-type multiple wavelength silica waveguide filter has been improved these days. However, disadvantages of this technology are its limited filtering mechanism, which filters out multi-wavelength channels separated only at a constant wavelength (or frequency) interval, and difficulty of selective filtering of arbitrarily separated multi-wavelength channels.

FIGS. 1 and 2 are views illustrating the construction of optical filters capable of separating multi-wavelength signals simultaneously in conventional arts.

FIG. 2 illustrates a multi-wavelength transmitting filter formed a number of pairs of identical Bragg gratings which have a different wavelength response for each pair and are connected to a polarization-division-multiplexer (PDM) through polarization controllers. For this type of filter the identity of the grating pair is very critical, and fiber lengths from the PDM to each grating of the same pair should be kept the same, which are not practically easy to use. In addition, for this type of filter there exist optical time delays among) the reflected signals of different wavelengths due to different travel distances between the PMD and each pair of the Bragg gratings. (S. V.

Chernikov and J. R. Yaylor, Optics Letters, Vol. 20, No. 14, pp. 1586–1588, 1995)

FIG. 2 illustrates a multi-wavelength transmitting filter formed with an optical circulator and a number of Bragg gratings of different wavelength responses. For this type of filter there also exist phase delays among the different wavelength channels due to the different locations of the Bragg filters from the optical circulator. Since the inherent group velocity delay between different wavelength channels in the waveguide's chromatic dispersion may (or can) be compensated with recent technologies on dispersion compensation in a relatively easy way, the transmission time delay among the different wavelength channels may cause a problem or require additional temporal delay circuit(s) in all-optical wavelength conversion and time synchronization between channels for high-capacity optical transmission networks. (Japan Patent No. JP07336327 A 951222 (9609) H04J-014/00)

SUMMARY OF THE INVENTION

Accordingly, it is an object of the present invention to provide an improved multiwavelength channel transmission filter which overcomes the problems encountered the conventional art.

It is another object of the present invention to provide an improved multi-wavelength channel transmission filter by which it is possible to selectively and simultaneously separate multiple wavelength channel signals without any transmission time delay among the multi-wavelength channels.

It is another object of the present invention to provide an improved multi-wavelength channel transmission filter which is capable of stabilizing and standardizing wavelengths (or frequencies) of multi-wavelength (or frequency) channels for a wavelength (or frequency) division multiplexed high capacity optical communication system, and separating multiple wavelength channel signals, and is well adaptable to various application and practical uses.

To achieve the above objects, there is provided an improved multi-wavelength channel transmission filter which is based on one optical circulator with four terminal ports, one polarization beam splitter (PBS), one half-wave plate, and the optical Bragg gratings connected with a waveguide in series. Each of the Bragg grating has an optical wavelength reflection characteristics determined in accordance with the grating structure.

Additional advantages, objects and other features of the invention will be set forth in part in the description which follows and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
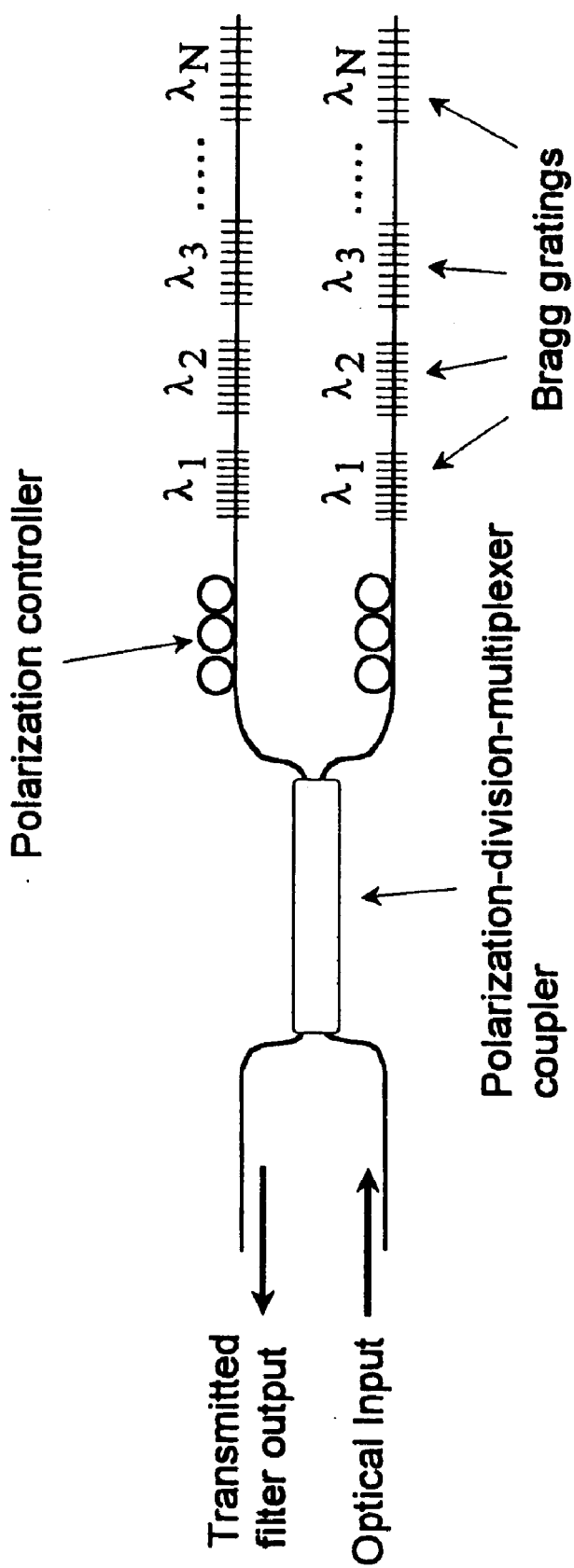
FIG. 1 is a view illustrating the construction of a multi-wavelength transmission type optical fiber filter with pairs of Bragg gratings, a polarization-division-multiplexing coupler, and polarization controllers in the conventional art.
Figure 2:
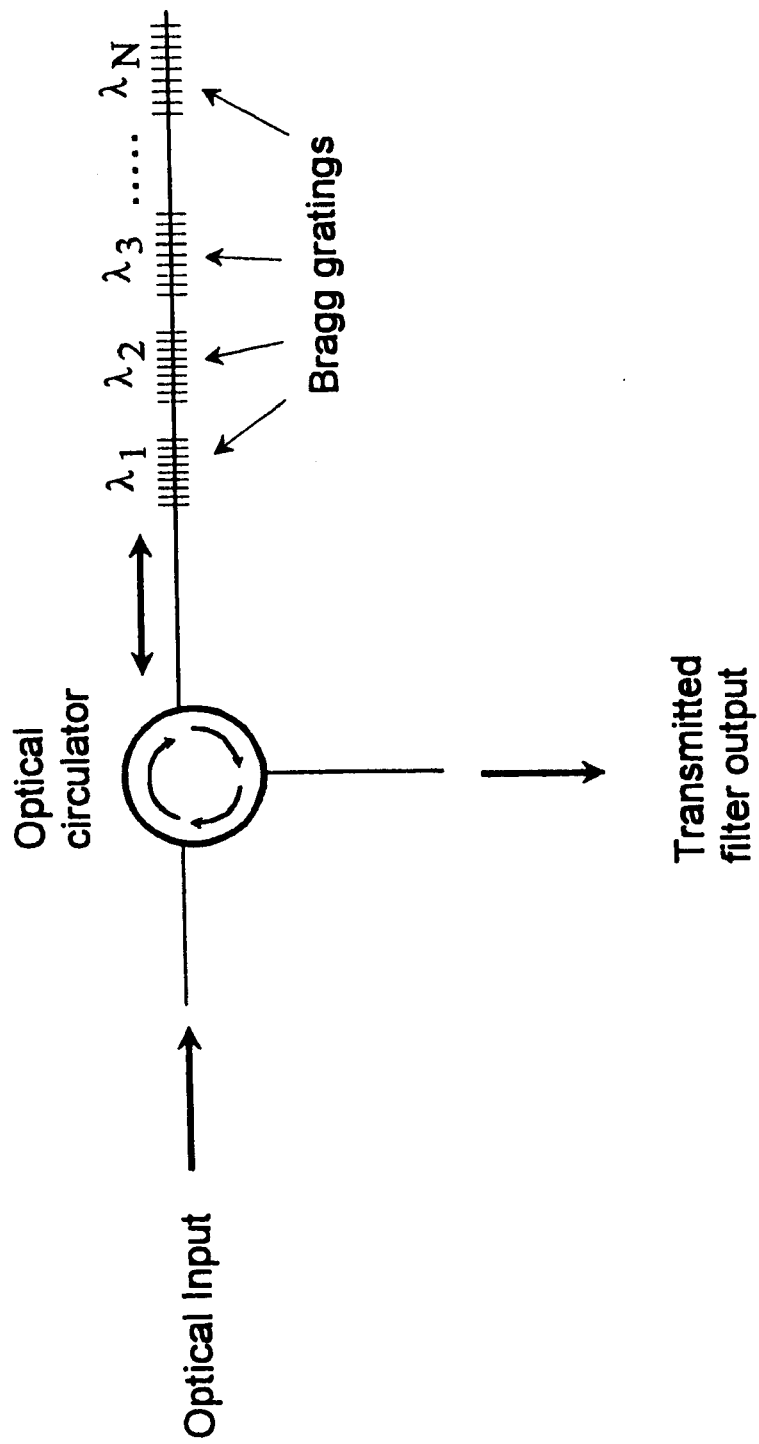
FIG. 2 is a view illustrating the construction of a multi-wavelength transmission type optical fiber filter with Bragg gratings and an optical circulator in the conventional art.
Figure 3A:
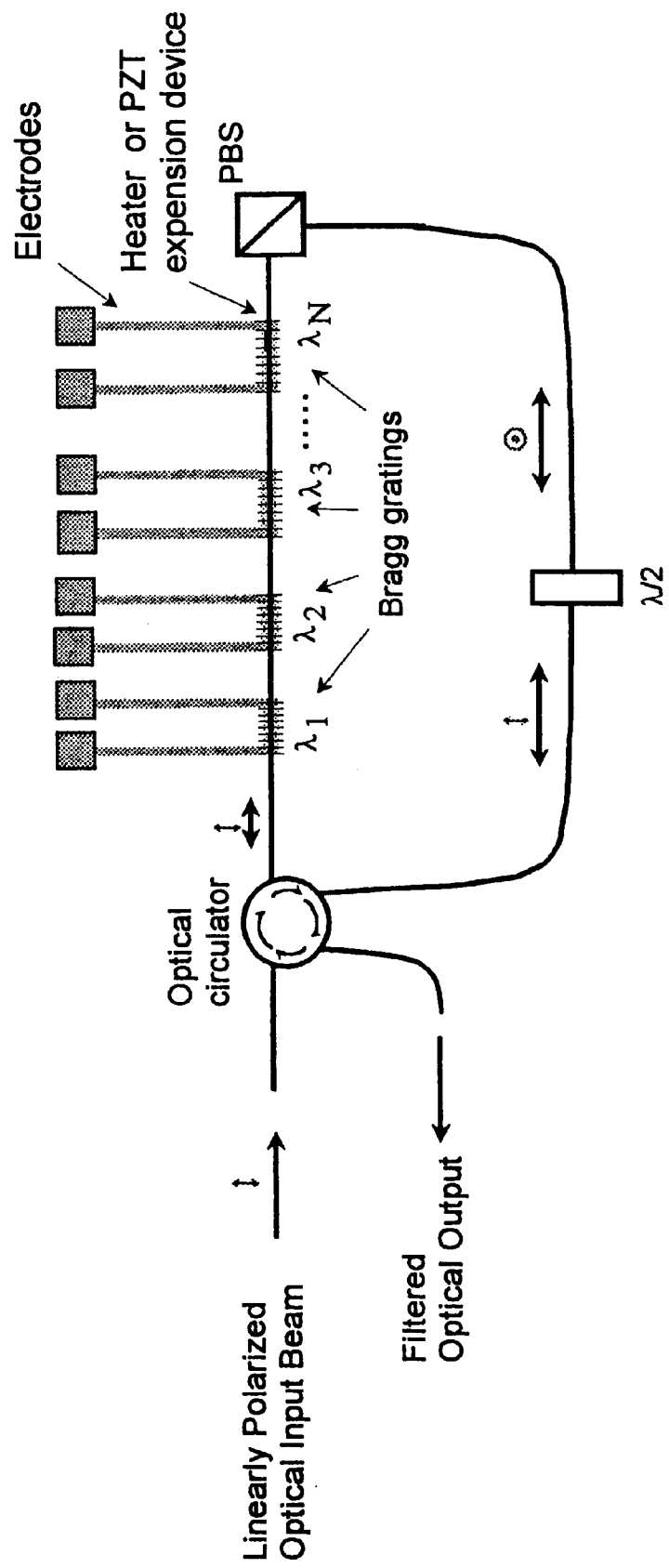
FIGS. 3(a), 3(b), 3(c) and 3(d) are views illustrating the construction of interchannel delay-free multi-wavelength transmission type optical filters with Bragg gratings, one polarization beam splitter PBS, one half-wave plate, and one optical circulator according to the present invention. Various type of filters can formed, depending on application, with additional attachements of 2×1 combiner/splitter(s), polarization-maintaining (PM) fibers, and polarization beam splitters (PBSs) or/and of pairs of 45° nonreciprocal Faraday rotator and 45° reciprocal rotator and reflectors.

FIGS. 3(a), (b), (c) and (d) are views illustrating the construction of interchannel delay-free multi-wavelength transmission type optical filters according to the present invention.

As shown in the drawing of FIG. 3(a), the optical filter according to the present invention basically consists of one optical circulator, one half-wave plate, one polarization beam splitter PBS, and optical Bragg gratings. A linearly polarized optical input beam enters the first terminal port of the optical circulator, comes out from the second terminal of the circulator travels the optical waveguide containing a series of optical Bragg gratings, each with different wavelength response, and is reflected back at the wavelength signals determined by the Bragg gratings. When the reflected signals exit from the third terminal port of the circulator, there are optical time delays among different wavelength channels due to different travel distances between the circulator and each Bragg grating. Then, the output signals from the third terminal port of the circulator pass through a half-wave plate, suffer a 90° polarization rotation, and enter the other end of the optical waveguide containing Bragg gratings through a polarization beam splitter. Since the optical signals travel the Bragg gratings in the opposite order compared to the previous travel made by the optical circulator, the optical time delays among different wavelength channels are now cancelled out. Thus, the filter provides an interchannel delay-free multi-wavelength transmission type optical filtering characteristics. This interchannel delay-free multi-wavelength reflected signal beam returns back to the third terminal port of the circulator by passing through the half-wave plate and by chaning its polarizarion state to be the same as that of the original input beam. Then, the filtered return signal comes out from the forth terminal port of the circulator. This type of filter is operational only to optical inputs polarized linearly along the same direction as that of the transmission beam of the polarization beam splitter used in the filter.

The Bragg gratings are placed along the optical waveguide consecutively in series between the circulator and the polarization beam splitter, so that it is possible to construct an optical filter having a multi-wavelength characteristics by combining the wavelength characteristic of each Bragg grating which is determined in accordance with the grating structure. The main role of the polarization beam splitter PBS placed next to the Bragg gratings is for separating out the unreflected optical beam by the Bragg gratings from the reflected beam.

Figure 3B:
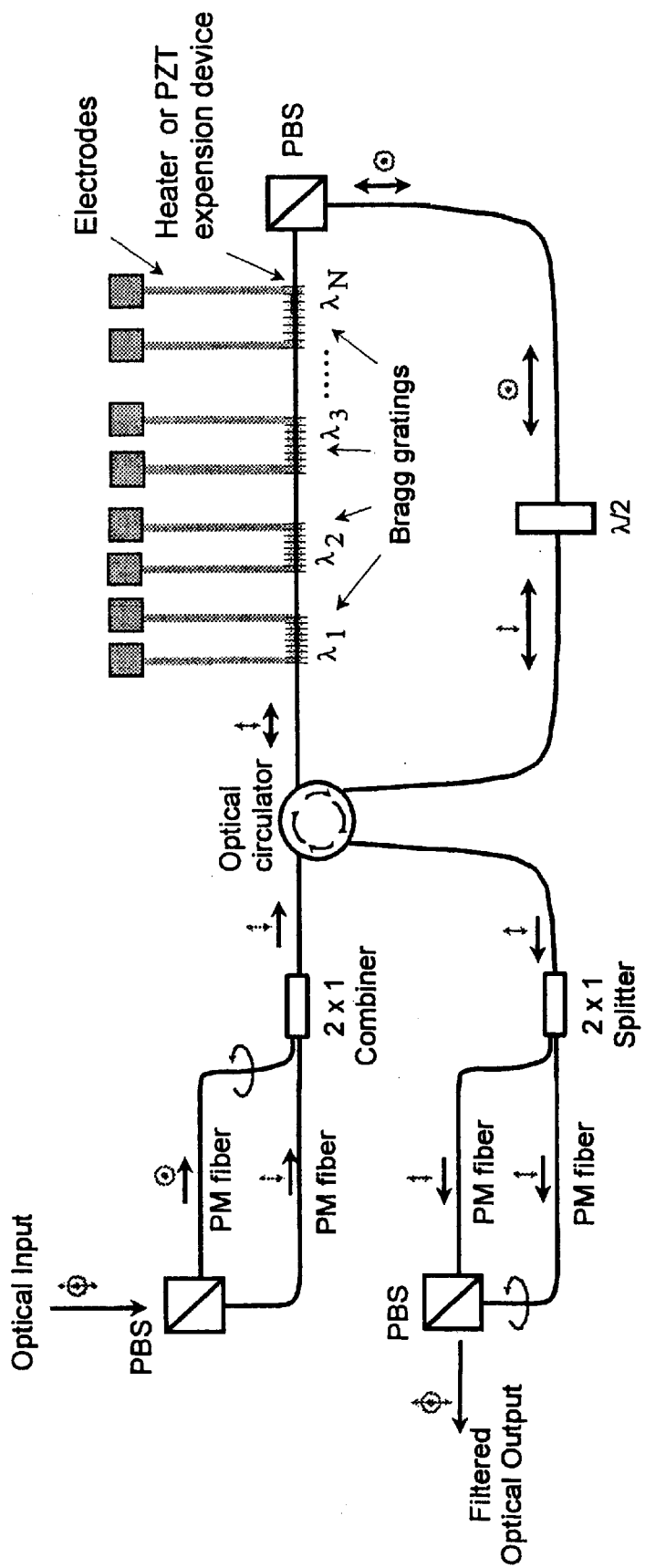

The filter structures shown in FIGS. 3(b), (c) and (d) indicate various filter schemes of the present invention for polarization-independent optical inputs.

In the drawing shown in FIG. 3(b), the optical input to the filter is first splitted into two different beams, each of opposite polarization, by the first polarization beam splitter. Then, the two linearly polarized optical beams are launched into two polarization-maintaining fibers, respectively, and then combined with a 2×1 optical combine coupler into a single-polarization beam by twisting the PM fibers so that their polarization states become aligned along the same direction. This combined single-polarization beam enters the same filter as shown in FIG. 3(a), and then filtered output beam comes out from the forth terminal port of the circulator. The filtered output takes a reversed process compared to the input process in order to deliver an unpolarized optical output by splitting the beam into two beams with a 2×1 optical splitter, launching them in two PM fibers, respectively, and by attaching the PM fibers to a polarization beam splitter in such a way that the two fiber beams combine into one beam at the PBS in a combined polarization state.

Figure 3C:
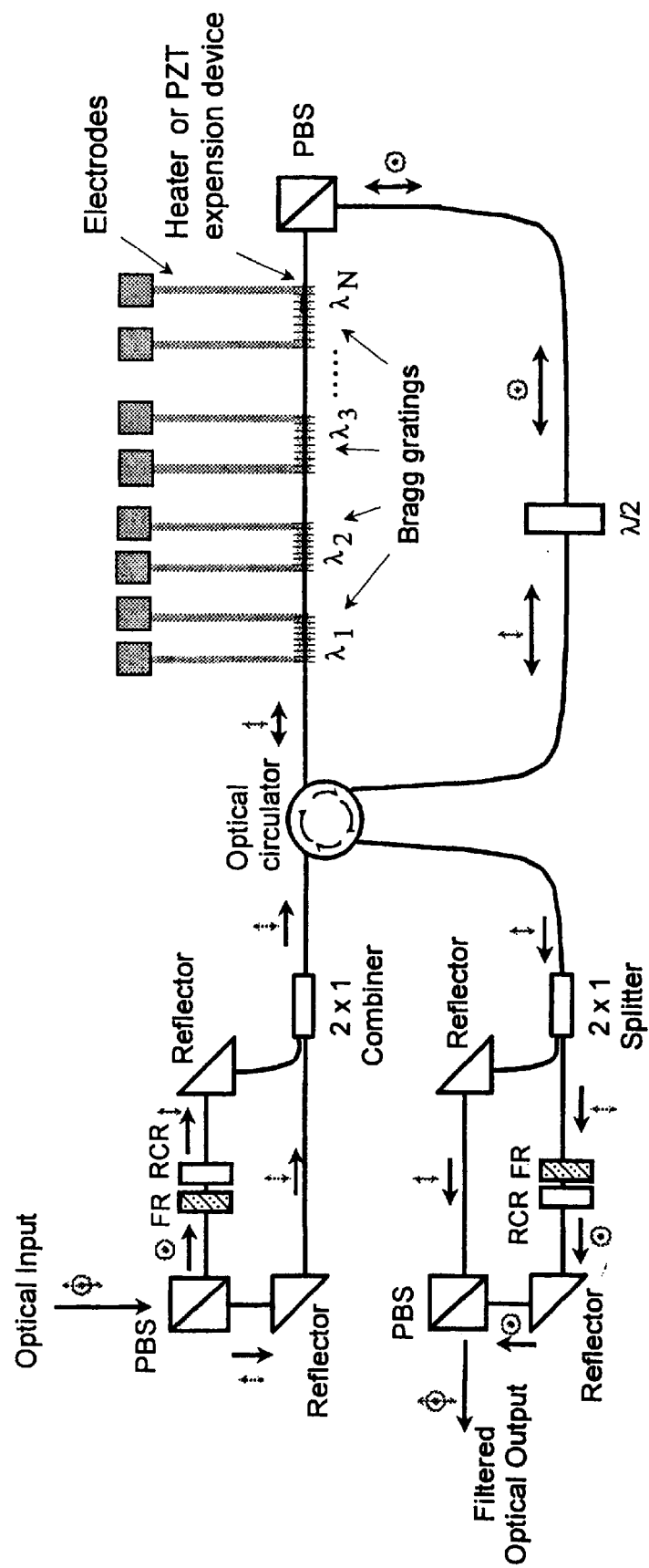

The filter structure shown in FIG. 3(c) is basically the same as that of FIG. 3(b) except that it uses bulk optics, such as pairs of 45° nonreciprocal Faraday rotator and 4520 reciprocal rotator and reflectors, instead of the PM fibers. The bulk optics performs the same polarization combining and splitting processes instead of using the PM fiber and fiber twist.

Figure 3D:
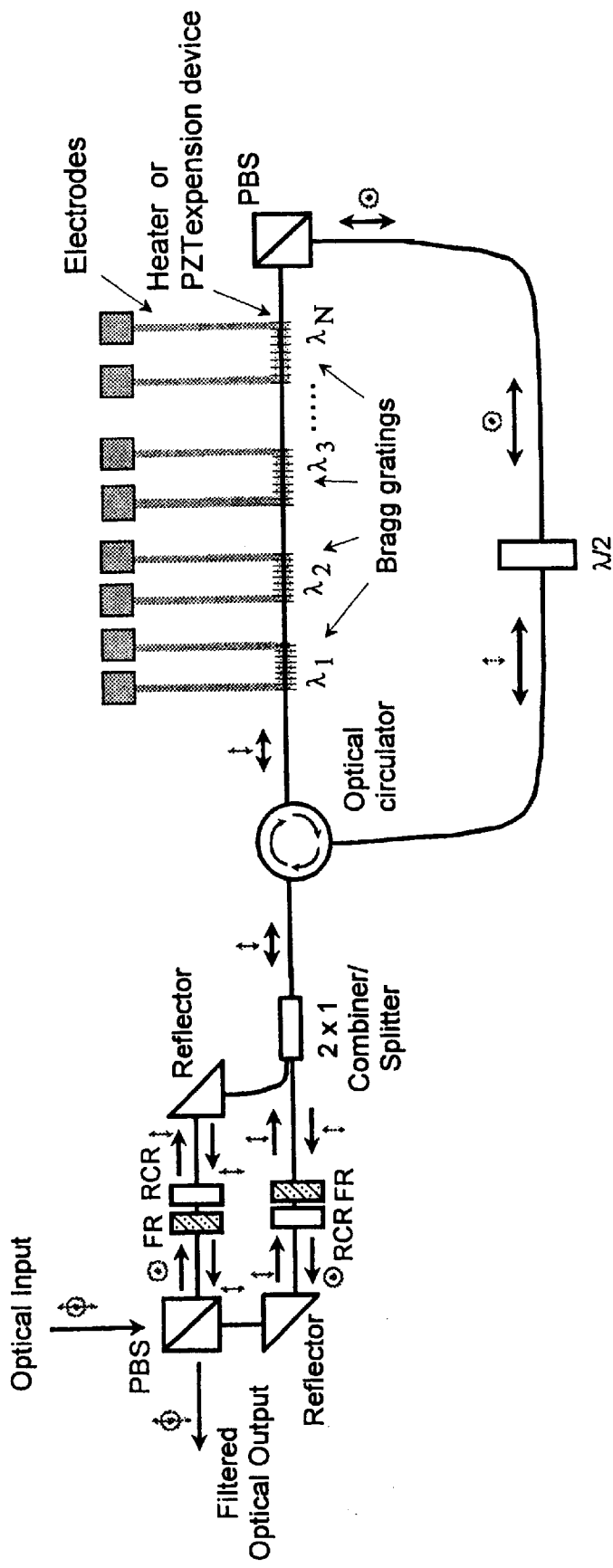

The filter structure shown in FIG. 3(d) is possible when a perfect optical circulator with three terminal ports is available instead of the circulator with four terminal ports used in FIGS. 3(a), (b) and (c). The polarization combining and splitting processes in the input and output ports of the filter shown in FIG. 3(c) are combined in one modular type instead of the two modular type. The polarization of the reflected beam by the input PBS is rotated by a 90° with the first pair of 45° nonreciprocal Faraday rotator and 45° reciprocal rotator, so that the polarizations of the two beams become the same. The two beams are combined into one beam of linear polarization with a 2×1 combiner, and enter into the first terminal port of the optical circulator just like a linearly polarized input does for the filter described in FIG. 3(a). The interchannel delay compensated filtered output by the Bragg gratings returns back to the third terminal port of the circulator, and comes out from the circulator through the first terminal port. This returned filtered signal beam passes through the 2×1 combiner/splitter, and splits into two beams. Since the two pairs of 45° nonreciprocal Faraday rotator and 45° reciprocal rotator are place in each optical path, respectively, in the opposite direction to each others, one beam on the path which did not cause a 90° polarization rotation when the input traveled in the opposite direction is now suffering a 90° polarization rotation while the other beam on the other path is suffering no polarization rotation. Thus, the two beams combines together into an unpolarized beam at the first polarization beam splitter, and exit from the PBS at the other port with respect to the input port.

When fabricating the optical filter according to the present invention, the Bragg grating is formed so that a desired wavelength characteristic is obtained. Thus, the multiple wavelength channel transmission type filter characteristics of FIGS. 3(a), (b), (c) and (d) can be changed by adjusting the wavelength reflection characteristics of the individual Bragg grating. In order to have a precise adjustment of the wavelength response of each Bragg grating, an additional mechanical expansion device, such as an electric heater or a piezoelectric translator, is attached on the grating. In addition, the filter system can be formed by an optical fiber and an optical fiber device.

As described above, the multi-wavelength channel transmission filter according to the present invention is directed to easily separating out various channel wavelengths compared to the plane integrated optical filter of the conventional Mach-Zehnder interferometer type (i.e., arrayed waveguide grating type), and accurately and individually controlling the transmission wavelength of the filter output.

In addition, the multi-wavelength channel transmission filter according to the present invention can be used as a wavelength-division-demultiplexing device, a reference wavelength device of many channel wavelengths, a multiple channel optical signal separation device in the large capacity wavelength-division-multiplexed optical communication networks.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What are claimed are:

1. An interchannel delay-free multi-wavelength transmission type optical filter, comprising:
   one optical circulator,
   one half-wave plate,
   one polarization beam splitter (PBS),
   a number of Bragg gratings formed in an optical waveguide for reflection of multi-wavelength channels by combining the wavelength characteristic of each Bragg grating which is determined in accordance with the grating structure.

2. The filter of claim 1, wherein the optical polarization combining and splitting circuits are added to each of the input and output sections, respectively, to form a filter scheme for polarization-independent optical input; and wherein the polarization combining and splitting circuits consist of polarization beam splitters, polarization-maintaining fibers, and 2×1 optical combiner and splitter, respectively.

3. The filter of claim 2, wherein two pairs of 45° nonreciprocal Faraday rotator and 45° reciprocal rotator and four reflectors are placed instead of the polarization-maintaining fibers to form another scheme of polarization-independent optical input filter.

4. The filter of claim 3, wherein a perfect optical circulator with three terminal ports is used instead of the circulator with four terminal ports; and wherein the polarization combining and splitting circuits in the input and output ports of the filter are combined in one modular type instead of the two modular type with two pairs of 45° nonreciprocal Faraday rotator and 45° reciprocal rotator placed in opposite direction to each other by reducing use of two reflectors and one 2×1 optical coupler.

5. The filters of claims 1, wherein a heater is arranged on each Bragg grating for periodically varying the interval of the Bragg grating so as to accurately control a wavelength characteristics of the Bragg grating.

6. The filters of claim 1, wherein a piezoelectric expansion device is arranged on each Bragg rating for periodically varying the interval of the Bragg grating so as to accurately control a wavelength characteristic of the Bragg grating.

7. The filters of claim 1, wherein an optical waveguide on a two-dimensional plane is used by using one selected from the group comprising an organic material, a silica, and a semiconductor.

* * * * *